Nov. 13, 1962

L. SILVERMAN 3,063,216

METHOD AND APPARATUS FOR FORMING
AND UTILIZING A FILTER MEDIUM

Filed Sept. 21, 1955

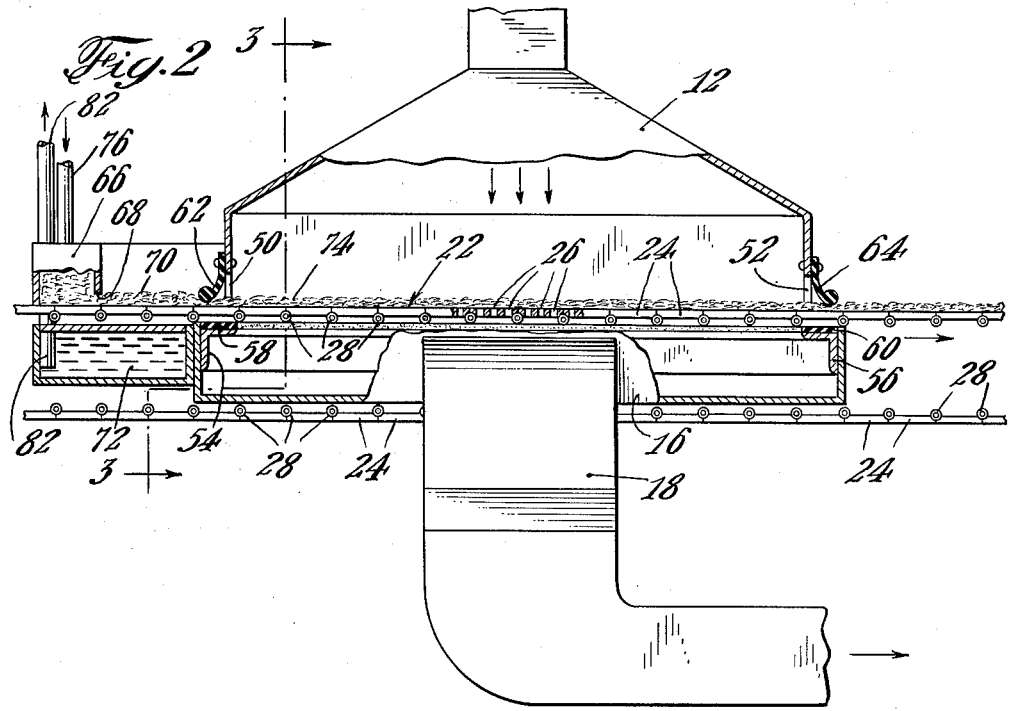
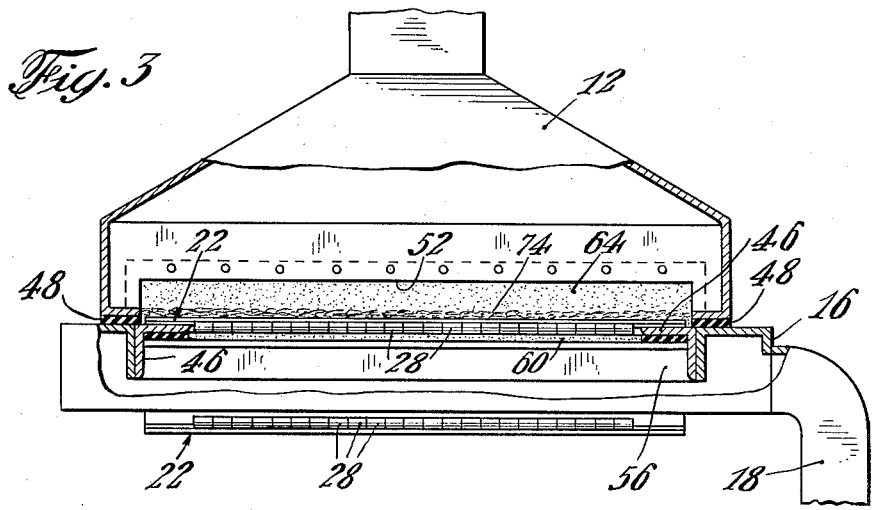

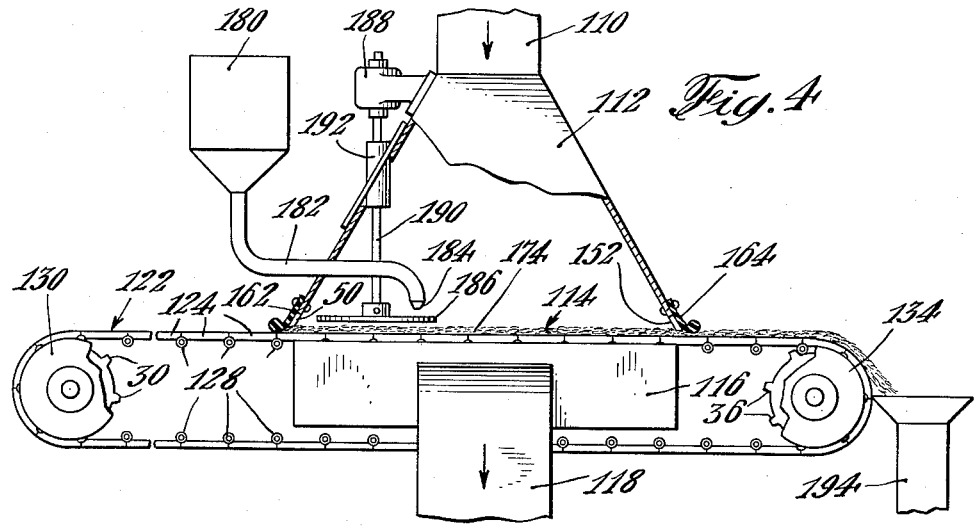
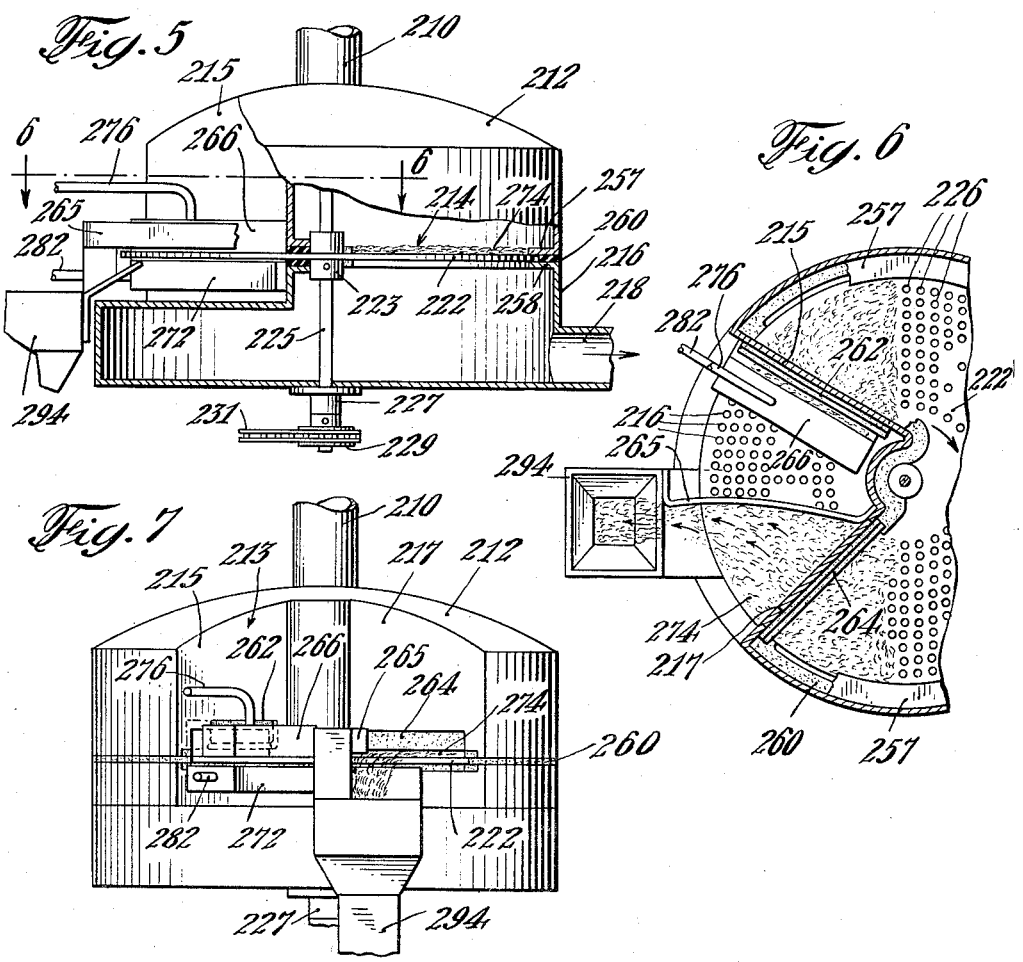

United States Patent Office 3,063,216
Patented Nov. 13, 1962

3,063,216
METHOD AND APPARATUS FOR FORMING AND UTILIZING A FILTER MEDIUM
Leslie Silverman, County Road, Dover, Mass.
Filed Sept. 21, 1955, Ser. No. 535,639
10 Claims. (Cl. 55—22)

The present invention relates to the separation of particles from a gas in which such particles are suspended. The particles may comprise dry solids or finely divided droplets of liquid or semi-liquid or the extremely finely divided material defined as "fume" which is generated in various commercial operations. For example in open hearth steel mills a fume is produced consisting of from 30% to 60% iron oxide with the remaining percentage consisting of various other materials. The iron oxide in such fume has been found to have a mean particle size ranging from 0.027 to 0.3 micron. The filter of the present invention is particularly useful in connection with extremely fine particles such as fume, and where desirable may be adapted for operation at high velocities and high temperatures. It will be apparent to those skilled in the art that a filter which is adapted for use under such extreme conditions can readily be adapted for use under less extreme conditions existing in many other applications.

Bag filters, wherein material such as woven fabrics are used as a filter medium, are ordinarily operated under such conditions that the velocity of the gas passing through the medium does not substantially exceed about two to three feet per minute. This means that with large quantities of gas to handle there must be provided extremely large areas of filter medium. When a volume of gas, such as that emitted from open hearth operations is involved, the use of filters restricted to such relatively low velocities becomes economically unadvisable. Obviously, also, many woven fabrics are not adapted for use in filtering furnace gases at temperatures which may run from 500° F. to 1000° F. It is apparent that an altogether different approach is required when large volumes of gas, extremely fine particles and high temperatures are encountered. The present invention provides a practical apparatus wherein economically feasible use may be made of a filter medium comprising a thick, relatively loosely aggregated bed of fiber such as rock wool or slag wool fiber. A fine mineral wool of this general type having an average diameter of four microns may be loosely felted into a mat of say ½″ to 2″ in thickness and such mat will successfully separate open hearth furnace fume from the suspending gas at velocities as high as 200′ per minute. At these velocities and considering the density of the fume, it becomes apparent that although a filter area of reasonable size will be adequate to handle the output of an open hearth furnace, the fact remains that such area of filter medium would soon become loaded with collected fume and its resistance to the flow of further gas would make it necessary to replace the filter medium with a new medium. Studies made by the applicant have revealed that it is within economic reason to collect about five pounds of fume per 100 pounds of mineral wool and even if only one ton per day of fume were to be collected, it would require approximately twenty tons per day of slag wool. While slag wool is relatively inexpensive and is readily available as a by-product at a steel mill, it nevertheless is not regarded as economically desirable to use and discard twenty tons per day of slag wool for each ton of fume collected.

It is in the background of such facts and studies that the present invention has been made. The present invention provides, in its preferred forms, for the reuse of mineral wool fiber whereby it is necessary only to supply new fiber to make up for losses incurred in use and handling, which losses can be held at a low level by careful design of apparatus. In the present invention mineral wool fibers, such as rock wool or slag wool, are supplied to apparatus which forms such fibers into a mat of desired thickness and density, such mat being formed continuously and being conducted through a stream of particle laden gas which it is desired to filter. The rate at which the mat is fed through the stream of gas is so selected that a substantial quantity of fume is collected in and upon each increment of area of the mat, whereupon the mat emerges from the stream of gas. The mat with its burden of fume or other particles is then passed through a reclaiming cycle in which the fume is separated from the fiber and the fiber is liberated from its mat form to be returned, in clean bulk form, to the mat-forming apparatus for reuse.

The mats of the present invention may be formed in any of the various manners familiar in the rock wool, paper, board and similar industries. Thus the fiber may be suspended in a gas or liquid and directed to a foraminous surface on which a mat of desired thickness is formed. Preferably, the foraminous surface is of such character that it and the mat formed thereon may be moved continuously or by increments from the mat-forming area through the filtering zone. Where reclamation of the fiber is desired the mat may be similarly moved from the zone of use into the reclaiming zone.

It will be recognized that certain of the principles of the present invention are applicable to the use of fibers of finely divided materials other than mineral wool, as a filter medium. Also, the fact that the fibers may be reused will reduce costs and disposal problems in connection with the filtering of radioactive or other wastes requiring special handling.

It is an object of the present invention to provide a filter in which a filter medium is formed from a bulk supply of disaggregate material into a mat of desired thickness which is exposed to a flow of particle laden gas and then withdrawn with the particles collected thereby to be discarded or, alternatively, to be reclaimed in disaggregate form for reuse. Other and further objects will become apparent from a consideration of the following detailed description of preferred but not necessarily the only forms of the present invention taken in connection with the drawings accompanying and forming a part of this specification.

In the drawings:

FIG. 2 is a section along the line 2—2 in FIG. 1;

FIG. 3 is a section along the line 3—3 in FIG. 2;

FIG. 4 is a somewhat diagrammatic view of a modified form of apparatus embodying certain aspects of the present invention;

FIG. 5 is a somewhat diagrammatic view of still another form of apparatus embodying the present invention;

FIG. 6 is a sectional view taken along the line 6—6 in FIG. 5; and

FIG. 7 is an elevational view taken from the left-hand side of FIG. 5.

Figure 1:
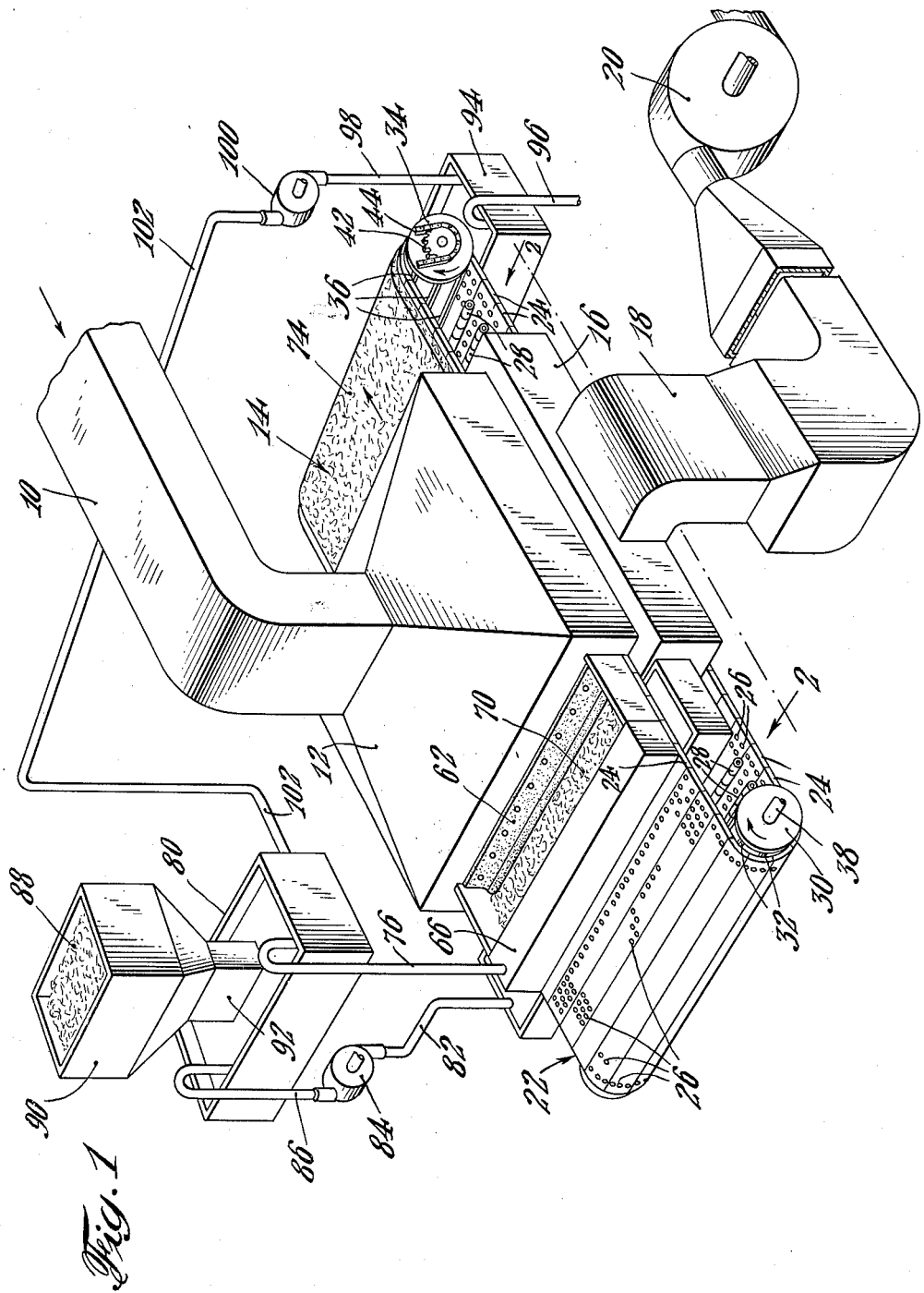
FIG. 1 is a perspective view of one form of filter embodying the present invention.

Referring now to the drawings, in FIGS. 1, 2 and 3, there is shown a filter apparatus embodying the present invention in a form which, although capable of use in many applications, incorporates particular features which make it useful in the filtering of fume from the flue gases generated in open hearth steel manufacture and similar operations. Referring first to FIG. 1, flue gases enter a conduit 10 communicating with an upper chamber 12. The flue gases from chamber 12 pass through a filter medium indicated generally at 14 which detains the particles and permits the particle free gas to flow into a lower chamber 16. The clean gas is withdrawn through a conduit 18 for discharge to the atmosphere or otherwise, as desired. Preferably gases are drawn through the filter apparatus of the present invention by means of a suction fan 20 which serves to reduce the gaseous pressure within the filter apparatus below the gaseous pressure existing outside the filter, whereby leakage which may occur will not result in escape of particle laden gas to the surrounding atmosphere although it will be realized that this preferred manner of operation is not critical to the present invention.

The filter medium is formed upon a continuous foraminous member 22 which may be made of any suitable material and in this preferred embodiment constitutes a series of articulated metal plates 24 each having a plurality of openings 26. Perforated metal suitable for the manufacture of the articulated plates 24 is readily available in forms in which approximately 50% of the area is constituted by the openings. For the purposes of the present invention, the openings should be relatively small, as will be discussed further hereinbelow. The articulated plates 24 are joined along their transverse edges by suitable hinges 28. The foraminous member 22 is in the form of an endless belt which is conducted over an idler roll 30 having grooves 32 to receive the hinges 28 and a driving roll 34 having similar grooves 36. The idler roll 30 may be arranged upon a shaft 38 which in turn may be supported in movable bearings (not shown) for the purpose of maintaining the endless foraminous member 22 under desired tension. The driving roll 34 may be fixed to a shaft 40 which also has affixed thereto a sprocket 42 arranged to be driven by a sprocket chain 44 connected with a suitable prime mover (not shown). It will be understood that rotation of the driving roll 34 in a clockwise direction, as viewed in FIG. 1, will be effective to move the upper reach of the endless foraminous member 22 toward the right as viewed in FIG. 1.

Referring now to FIG. 3, it will be observed that the endless foraminous member 22 includes edge portions which extend laterally beyond the hinges 28 to rest upon angles 46 which are secured to the lower chamber 16. These supporting angles 46 extend throughout the length of the lower chamber 16 and thus serve to support the foraminous member 22 in a horizontal plane during its passage between the lower chamber 16 and the upper chamber 12.

Also as shown in FIG. 3, the upper and lower chambers 12 and 16 may be sealed together by means of gaskets 48 made of rubber, asbestos or other material suitable for the temperature and other conditions to which the apparatus may be exposed.

In FIG. 2 it will be observed that the upper chamber 12 is provided with openings 50 and 52 through which the foraminous member 22 enters and leaves the upper chamber. The lower surface of the foraminous member 22 as disclosed herein, is not smooth due to the presence of the hinges 28 and since it is desired to form a reasonably effective gas-tight seal between such lower surface and the lower chamber 16, there may be provided angles 54 and 56 which carry gaskets 58 and 60, respectively. These gaskets are of such width as to span at least two adjacent hinges 28 whereby in any position of the foraminous member 22 at elast one of such hinges will press against the upper surface of each of the gaskets 58 and 60. Obviously the hinges 28 may be positioned on the upper surface of the foraminous member 22 where they will be covered by the matted fibers and the smooth lower surface will form a very effective seal against the gaskets 58 and 60.

From the description so far, it will be apparent that the foraminous member constitutes substantially the only path through which gas may enter the lower chamber 16 when the suction fan 20 is put into operation. The filter material indicated generally at 14 is formed as a mat upon the upper surface of the foraminous member as will be described. Provision is made for forming a reasonably airtight seal between the upper surface of the filter medium 14 and the upper chamber 12. Thus, as shown in FIGS. 2 and 3, flexible flaps 62 and 64 are secured by their upper edges to the upper chamber 12 in a position to tend to close the openings 50 and 52. The flaps 62 and 64 may be made of any material such as rubber, asbestos or the like, and they are so posiitoned as to rest upon the upper surface of the filter medium while permitting the filter medium to be moved longitudinally through the upper chamber 12. As indicated above, it is preferred to operate the apparatus under sub-atmospheric pressure so that the flaps 62 and 64 will be drawn inwardly to press upon the filter medium and any leakage which occurs along the edges of the flaps or the gaskets 48, 58 and 60 will take the form of an inflow of the surrounding atmosphere.

The filter medium 14 may be formed as a mat upon the foraminous member 22 in any desirable or suitable manner and from any desirable and suitable material. Mineral wool such as rock wool or slag wool is preferred for high temperature operation and fiber of this sort may be deposited on the foraminous member 22 from suspension in gas or liquid. A preferred manner of depositing such layer is illustrated in FIGS. 1 and 2 wherein the mineral wool fiber suspended in water with or without wetting agents to promote dispersion of the fibers, is supplied to a headbox 66 having a slice 68 from which the suspended fiber may flow on to the moving foraminous member 22 to form a layer 70 of water and fiber suspended therein. The water in layer 70 will drain through the holes 26 in the foraminous member 22 by gravity or by suction as preferred to enter a box 72 positioned beneath the headbox and the drainage area which extends from the slice 68 to the flap 62. As illustrated in the drawings, the headbox 66 is located quite close to the filter structure and the drainage area is relatively small but it will be understood that the drainage area may be extended and that drainage may be facilitated by additional suction boxes or the like wherever necessary to reduce the mat to any desired condition of dryness before it enters the filter. For practical purposes, however, water will drain very rapidly from mineral wool and a well felted, substantially dry mat will be formed with a very restricted drainage area such as illustrated in the drawings. Thus the mat will be a coherent felted structure indicated at 74 by the time it enters the filter zone.

The headbox 66 may be supplied through a line 76 (see FIG. 1) extending from a chest 80 in which the suspension of fiber in water is formed. The water which drains into the box 72 may be withdrawn through a line 82 and pump 84 to be discharged through a line 82 and pump 84 to be discharged through line 86 into the chest 80. A supply of fiber 88 may be maintained in a hopper 90 having an outlet 92 through which fiber may be supplied to the chest 80 at any desired rate. While the fiber 88 may be supplied at a rate sufficient to constantly form a new mat 74, it is preferred for economical reasons to reclaim the fiber from the used mat 74, as will be described, and in that event the fiber 88 is supplied only to such rate as to make up for losses in handling. For example, in a typical installation it has been found about 10% new fiber is required for each cycle when slag wool is used.

Referring now to FIG. 1, there is provided a tank 94 which is positioned beneath the driven roll 34 so as to receive the mat 74 as it drops off the foraminous member 22 in the course of passage around the roll 34. If so desired, a suitable scraper or doctor blade (not shown) may be provided to facilitate removal of the mat 74 from the foraminous member 22. A water line 96 enters the tank 94 and serves to supply sufficient water to reduce the mat 34 to a suspended slurry of fiber. If necessary, any suitable form of agitating means (not shown) may be arranged in the tank 94 to facilitate the formation of such slurry. The slurry formed in tank 94 is withdrawn through a line 98 by a pump 100 which discharges into a line 102 leading to the chest 80. The slurry thus returned to the chest 80 is made available for formation of the mat 74.

The fume or other particles collected by the filter medium 14 will be carried by the mat 74 into the tank 94 where, depending upon the nature of the particles, suitable provision must be made for collecting and disposal of such particles. In many instances particles will separate from the fibers and will settle to the bottom of the tank 94. In other instances supplemental settling tanks (not shown) may be useful. The settled particles may be removed continuously or periodically, as desired. Obviously, some of the particles will be recirculated with the slurry but the speed of operation of the device can be set so as to operate efficiently even though some recirculated particles may remain on the fibers as the mat 74 first enters the filtering zone. If the particles do not flocculate readily in water or are water-soluble or if they are of such nature as to persistently adhere to the fibers while suspended in water, suitable supplemental separating steps will be apparent to those skilled in the art. Thus, suitable flocculating agents may be used when needed. In the case of water-soluble particles, the liquid in the tank 94 will perhaps be discarded and it may be necessary to separate the fibers from such liquid on a drum filter or the like and to resuspend them in fresh water before return to the chest 80. In the case of particles which do not readily separate from the fibers in water a detergent or suitable chemical may be used to promote separation and drum filters may be used if economically desirable. In any event, the separation of the particles from the fibers will be dependent upon the nature of the particles and the value and nature of the fibers used. The details of such separating steps are not critical to the present invention.

As indicated above, the apparatus just described is particularly adapted for use with mineral wool fiber in the collecting of fume from gases produced in open hearth steel and similar high temperature processes. When used in connection with steel making, the fume contains a substantial percentage of iron oxide particles which flocculate readily and are readily separable from the fibers upon immersion in water as disclosed herein. The flocculated fume together with the broken fibers will settle quite satisfactorily in the tank 94. If the fume has value it may be separated from the broken fibers, shot and other debris, and recovered on thickeners if so desired.

In FIG. 4 there is illustrated a modified form of apparatus in which the fibers are formed in the filter and laid on a moving foraminous member from gaseous suspension. In this modification of the invention the particle-laden gas is introduced through a conduit 110 to an upper chamber 112 and through a filter medium 114 which detains the particles while the clean gas passes into a lower chamber 116 for discharge through a conduit 118. Here again it is desirable to utilize a suction fan (not shown) in the conduit 118 to draw the particle-laden gas through the apparatus at a gaseous pressure somewhat below that of the surrounding atmosphere. A foraminous member 122 may be made up of articulated perforated plates 124 connected by hinges 128, all as described in detail in connection with FIGS. 1 through 3. The foraminous member 122 is in the form of an endless belt extending around an idler roll 130 and a driven roll 134 as disclosed in connection with FIGS. 1 through 3. The upper chamber 112 is provided with openings 150 and 152 through which the foraminous member 122 may enter and leave the chamber 112. Sealing flaps 162 and 164 similar in construction and operation to those described in connection with FIGS. 1 through 3 may be provided.

The filter mat 174 is formed of mineral wool fibers such as rock wool or slag wool which is deposited from gaseous suspension upon the foraminous member 122 within the upper chamber 112. While the fibers might be introduced in gaseous suspension from a bulk supply exterior of the chamber 112, a convenient and simple expedient for the supply of fibers is shown in FIG. 4. Thus the mineral in molten form is supplied to a tank 180 from which it flows through line 182 to a nozzle 184. The nozzle 184 may be similar to those customarily used in the rock wool manufacturing industry and thus will be arranged to project one or more fine streams of molten mineral upon a rapidly rotating disk 186. The disk 186 may be driven by a motor 188 exterior of the housing 112 and connected with the disk 186 by a shaft 190 passing through a bearing 192. The rapidly rotating disk 186 will serve to break the stream or streams of molten material into relatively short lengths which, upon cooling, will constitute fibers. The disk 186 will also serve to distribute such fibers throughout the width of the foraminous member 122. Inasmuch as the gaseous pressure in the chamber 112 is higher than that in the lower chamber 116, the gas within the chamber 112 will flow through a foraminous member 122 and the fibers thrown from the spinning disk 186 will settle upon the foraminous member to form a mat. The foraminous member 122 is driven at such a linear speed with regard to the quantity of molten mineral supplied to the nozzle 184 as to insure the formation and the maintenance of a mat of fibers of sufficient thickness to serve as a filter medium for the particular particle laden gas which it is desired to filter. The mat 174 with its burden of particles is constantly withdrawn beneath the sealing flap 164 and may be discharged from the right hand end of the foraminous member into a chute or receptacle 194. The fiber thereafter may be discarded or reclaimed for some other use as may be desired.

In FIGS. 5 through 7 there is shown a still further modification of the apparatus of the present invention which offers particular advantage in compactness and which lends itself to multiple installations in vertically tiered arrangements. In this form of the invention the particle laden gas enters the conduit 210 leading to an upper chamber 212 from which it flows through a filter medium 214 to a lower chamber 216 having an outlet conduit 218. Here again it is preferable to connect a suction fan (not shown) with the conduit 218 whereby to draw the gas through the apparatus at a pressure somewhat below that of the surrounding atmosphere. In this form of the invention the foraminous member comprises a disk 222 preferably formed of metal and being provided with a plurality of closely spaced holes 226 throughout the major portion of the area thereof. The peripheral portion of the disk 222 is received between flanges 257 and 258, respectively, formed on the upper and lower chambers 212 and 216. The flanges 257 and 258 are spaced by a gasket 260 made of asbestos, rubber or other suitable material, which serves to form an airtight seal and at the same time serves to provide sufficient space between said flanges to provide a sliding fit for the peripheral portion of the disk 222. The peripheral portion of the disk 222 will therefore serve to substantially seal the upper chamber 212 from the lower chamber 216, thus to prevent any substantial leakage of particle laden gas from the upper chamber 212 to the lower chamber 216.

The foraminous member or disk 222 is provided with a hub 223 secured to a vertical shaft 225 which extends through a bearing 227 to the exterior of the lower chamber 216. A sprocket 229 affixed to the shaft 225 may be driven by a chain 231 whereby to rotate the foraminous member 222 at a suitable speed.

As viewed in FIG. 6, the foraminous member 222 is rotated in a clockwise direction. A headbox 266 is connected through a line 276 to a chest (not shown) from which is supplied a suspension in water of a fiber such as mineral wool fiber. The headbox 266 is provided with a slice (not shown) from which the suspension flows on to the foraminous member 222 to form a mat 274 substantially as described above in connection with FIGS. 1 through 3. The water forming such suspension drains through the foraminous member 222 into a box 272 from which it may be withdrawn through a line 282 for reuse if so desired. The box 272 may be placed under suction to facilitate drainage of the mat if so desired.

As will be apparent from an inspection of FIG. 7, the upper chamber 212 is provided with a segmental recess 213 defined by vertical walls 215 and 217 (see FIG. 6) whereby to expose a segment of said forminous member outside the chamber 212. The headbox 266 is positioned over such exposed area. The mat formed by the headbox 266 enters the chamber 212 beneath the wall 215 and a sealing flap 262 which rests upon the mat in the manner and for the purpose described above in connection with FIGS. 1 through 3. As the mat proceeds through the enclosed portion of the upper chamber 212, it serves as a filter medium and collects particles from the gas passing from chamber 212 to chamber 216. The mat carrying such particles emerges beneath the wall 217 and sealing flap 264. A scraper 265 is positioned in contact with the exposed upper surface of the foraminous member 222 in such position as to remove the mat 274 therefrom and progressively to guide it to the outer periphery of the foraminous member 222 from which it is discharged into a receptacle or chute 294. The fiber and accumulated particles may be separated as described above and the fibers returned through a system (not shown) similar to that disclosed in FIGS. 1 and 3 for reuse in the present apparatus. Alternatively, the fiber and accumulated particles may be discarded or otherwise disposed of.

In all of the forms of the invention illustrated herein, the foraminous member on which the filter medium is formed is described as perforated metal constructed as an articulated belt or as a disk. It will be understood that foraminous structures such as woven wires or expanded metal may be used where appropriate and also that the foraminous member may be composite, for example a perforated or expanded metal may be used as a backing for a more fragile, relatively fine mesh wire or fiber glass cloth or felt which may be payed out from a supply roll. Obviously the selection of appropriate foraminous materials will depend upon the nature of the fibers selected for a particular installation and upon the conditions under which the apparatus is to be used.

I claim:

1. A filter for separating particles from a gas, comprising a foraminous member, means for moving said foraminous member along a predetermined path, means along said path for applying a supply of discrete fibers suspended in a fluid to said foraminous member said last named means comprising means for forming a suspension of discrete fibers in a fluid, and means for directing said suspended fibers to one side of said foraminous member and for passing the fluid in which said fibers are suspended through said foraminous member to deposit upon said foraminous member a filter medium of matted fibers, and means for directing a stream of particle laden gas through the filter medium thus formed to separate the particles therefrom.

2. A filter for separating particles from a gas, comprising means for directing a particle laden gas along a predetermined path, a foraminous member, means for applying a supply of discrete fibers suspended in a fluid to said foraminous member said last named means comprising means for forming a suspension of discrete fibers in a fluid, and means for directing said suspended fibers to one side of said foraminous member and for passing the fluid in which said fibers are suspended through said foraminous member to deposit upon said foraminous member a filter medium of matted fibers, and means for advancing said foraminous member past said fiber applying means and into said path in the sequence stated.

3. A filter for separating particles from a gas, comprising means for directing a particle laden gas along a predetermined path, a foraminous member, means for moving said foraminous member along a closed path, means along said closed path for applying a supply of discrete fibers suspended in a fluid to said foraminous member and thereby form a filter medium of matted fibers, means along said closed path for guiding said foraminous member and the matted fibers carried thereby through the path of said particle laden gas whereby to separate the particles therefrom, means along said closed path for removing said matted fibers and the particles accumulated thereby from said foraminous member, means for separating said removed matted fibers from each other and from the particles accumulated thereby and for suspending said fibers in a fluid, and means for returning said separated fibers to said means for applying discrete fibers to said foraminous member.

4. In a filter for separating particles from a gas, the combination of an enclosure having an inlet and an outlet, a pair of guide rolls, a foraminous member in the form of an endless belt conducted around said guide rolls, means within said enclosure for guiding one reach of said endless belt through said enclosure in a position between said inlet and said outlet whereby to divide said enclosure into two chambers communicating with one another only through said foraminous member, means for driving at least one of said guide rolls whereby to move said endless belt through a closed path, means along said closed path for applying a supply of discrete fibers suspended in a fluid to said moving foraminous member and thereby form a filter medium of matted fibers on said foraminous member before said foraminous member enters said enclosure, means for directing a particle laden gas through said enclosure whereby said layer of matted fibers serves as a filter medium to separate the particles from said particle laden gas, means along said closed path for removing said matted fibers and the particles accumulated thereby from said foraminous member, means for separating said removed matted fibers from each other and from the particles accumulated thereby and for suspending said fibers in a fluid, and means for returning said separated fibers to said means for applying discrete fibers to said foraminous member.

5. In a filter for separating particles from a gas, the combination of an enclosure having an inlet and an outlet, a pair of guide rolls, a foraminous member in the form of an endless belt conducted around said guide rolls, means within said enclosure for guiding one reach of said endless belt through said enclosure in a position between said inlet and said outlet whereby to divide said enclosure into two chambers communicating with one another only through said foraminous member, means for driving at least one of said guide rolls whereby to move said endless belt through a closed path, a head-box mounted above said foraminous member in a portion of said closed path ahead said enclosure, said head-box having a slice, means for supplying a suspension of discrete fibers in water to said headbox whereby a layer of fibers and water will be formed between said slice and said foraminous member, means for receiving water draining through said foraminous member to form a filter medium of matted fibers on said foraminous member before said foraminous member enters said enclosure, and means for directing a particle laden gas through said enclosure whereby said layer of matted fibers serves as a filter medium to separate the particles from said particle laden gas.

6. In a filter for separating particles from a gas, the combination of an enclosure having an inlet and an outlet, a pair of guide rolls, a foraminous member in the form of an endless belt conducted around said guide rolls, means within said enclosure for guiding one reach of said endless belt through said enclosure in a position between said inlet and said outlet whereby to divide said enclosure into two chambers communicating with one another only through said foraminous member, means for driving at least one of said guide rolls whereby to move said endless belt through a closed path, a nozzle located within one of said chambers adapted to form a molten mineral material into discrete fibers of small diameter, means within said one chamber for distributing said discrete fibers over the surface of said foraminous member, means for supplying molten mineral material to said nozzle, means for directing a particle laden gas to said one chamber, suction means connected with said other chamber for drawing gas from said one chamber through said foraminous member into said other chamber thereby to form on said foraminous member a layer of matted fibers supplied by said nozzle and said layer of matted fibers serving as a filter medium for separating particles from said particle laden gas.

7. A filter for separating particles from a gas, comprising means for directing a particle laden gas along a predetermined path, a foraminous disk rotatable about an axis perpendicular to the plane of said disk, means for applying a supply of discrete fibers suspended in a fluid to said foraminous disk and thereby form a filter medium of matted fibers, and means for rotating said foraminous disk past said fiber applying means and into said path in the sequence stated.

8. In a filter for separating particles from a gas, the combination of an enclosure of substantially cylindrical form, a foraminous disk rotatable about the axis of said cylindrical enclosure, said disk having a diameter substantially commensurate with the diameter of said cylindrical enclosure, means slideably engageable with peripheral portions of said disk for forming a substantially gas-tight seal between said disk and said enclosure whereby said disk serves to divide said enclosure into two chambers communicating with one another only through said foraminous disk, means for rotating said disk about said axis, said enclosure having walls diverging substantially radially of and perpendicularly to said disk, said walls defining a segmental cavity in said substantially cylindrical enclosure in which a corresponding segment of said foraminous disk is exposed outside said enclosure, means for applying a supply of discrete fibers suspended in a fluid to a portion of the exposed segment of said foraminous disk to form thereon a layer of matted fibers which is carried by said rotating foraminous disk into said enclosure, means for directing particle laden gas through said enclosure whereby said layer of matted fibers serves as a filter medium to remove particles from said gas, and means for removing from said foraminous disk said layer of matted fibers and the particles accumulated thereby as said layer emerges from said enclosure into said cavity.

9. The method of separating particles from a gas in which said particles are suspended comprising, directing a stream of particle laden gas along a predetermined path, forming a continuous layer of matted fibers by directing a supply of discrete fibers suspended in a fluid through a continuously moving foraminous body which will retain said fibers and will pass said fluid, and progressively moving said foraminous body with said layer of matted fibers thereon through the path of said particle laden gas.

10. The method of separating particles from a gas in which said particles are suspended comprising, directing a stream of particle laden gas along a predetermined path, forming a continuous layer of matted fibers by directing a supply of discrete fibers suspended in a fluid through a continuously moving foraminous body which will retain said fibers and will pass said fluid, progressively moving said foraminous body with said layer of matted fibers thereon through the path of said particle laden gas, and continuously removing said layer of matted fibers and the particles accumulated thereby from said foraminous body.

References Cited in the file of this patent

UNITED STATES PATENTS

| 746,257 | Baggaley | Dec. 8, 1903 |
| 2,815,826 | Young | Dec. 10, 1957 |

FOREIGN PATENTS

| 24,125 | France | Nov. 29, 1921 |
| | (1st addition to No. 492,200) | |
| 704,568 | France | Feb. 23, 1931 |
| 196,160 | Great Britain | Apr. 19, 1923 |
| 472,324 | Germany | Feb. 26, 1929 |
| 479,930 | Canada | Jan. 1, 1952 |